(12) United States Patent
Zarra et al.

(10) Patent No.: US 10,840,505 B2
(45) Date of Patent: Nov. 17, 2020

(54) APPARATUS AND METHOD OF PROVIDING AN APPARATUS FOR USE AS A POWER SOURCE

(71) Applicant: Nokia Technologies Oy, Espoo (FI)

(72) Inventors: Salvatore Zarra, Cambridge (GB); Di Wei, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 121 days.

(21) Appl. No.: 15/759,462

(22) PCT Filed: Sep. 12, 2016

(86) PCT No.: PCT/FI2016/050629
§ 371 (c)(1),
(2) Date: Mar. 12, 2018

(87) PCT Pub. No.: WO2017/046448
PCT Pub. Date: Mar. 23, 2017

(65) Prior Publication Data
US 2018/0254479 A1    Sep. 6, 2018

(30) Foreign Application Priority Data

Sep. 18, 2015    (EP) .................................. 15185847

(51) Int. Cl.
*H01M 4/38*    (2006.01)
*H01M 4/62*    (2006.01)
(Continued)

(52) U.S. Cl.
CPC ............. *H01M 4/38* (2013.01); *H01M 4/625* (2013.01); *H01M 6/181* (2013.01); *H01M 6/26* (2013.01);
(Continued)

(58) Field of Classification Search
CPC ......... H01M 4/38; H01M 4/625; H01M 10/32
(Continued)

(56) References Cited

U.S. PATENT DOCUMENTS 2,428,850 A    10/1947 Lawson
2,930,830 A    3/1960  Lieb et al.
(Continued)

FOREIGN PATENT DOCUMENTS

EP    3007266 A1    4/2016
EP    3096389 A1    11/2016
(Continued)

OTHER PUBLICATIONS

Silver. Sep. 25, 2019. In Wikipedia. Retrieved on Sep. 25, 2019 from the Internet. <URL: https://en.wikipedia.org/w/index.php?title=Silver&oldid=917688106> (Year: 2019).*

(Continued)

*Primary Examiner* — James M Erwin
(74) *Attorney, Agent, or Firm* — Harrington & Smith (57) ABSTRACT

An apparatus and method of providing an apparatus, the apparatus comprising: an electrode comprising metal; an anode comprising a composite of halide salt and conductive carbon based material wherein the anode is deposited on the electrode; a cathode comprising metal; and a solid electrolyte provided between the cathode and the anode.

20 Claims, 8 Drawing Sheets

(51) Int. Cl.
*H01M 10/32* (2006.01)
*H01M 6/18* (2006.01)
*H01M 6/26* (2006.01)
*H01M 6/32* (2006.01)

(52) U.S. Cl.
CPC .............. *H01M 10/32* (2013.01); *H01M 6/32* (2013.01); *H01M 2300/0082* (2013.01)

(58) Field of Classification Search
USPC ...................................................... 429/231.8
See application file for complete search history.

(56) References Cited

U.S. PATENT DOCUMENTS

| | | | |
|---|---|---|---|
| 9,728,771 B2 | 8/2017 | Wei et al. | |
| 2012/0064409 A1 | 3/2012 | Zhamu et al. | |
| 2012/0251881 A1 | 10/2012 | Woehrle et al. | |
| 2013/0157122 A1* | 6/2013 | Tsai .................... | H01M 10/056 429/189 |
| 2013/0224632 A1* | 8/2013 | Roumi .................. | H01M 2/166 429/516 |
| 2013/0273405 A1* | 10/2013 | Takahashi ......... | H01M 10/0436 429/127 |
| 2013/0323608 A1* | 12/2013 | Chang .............. | H01M 10/0566 429/338 |
| 2014/0178763 A1 | 6/2014 | Mettan | |
| 2014/0295273 A1* | 10/2014 | Mah .................... | H01M 4/1395 429/220 |

FOREIGN PATENT DOCUMENTS

| | | |
|---|---|---|
| EP | 3103768 A1 | 12/2016 |
| KR | 2013-0028423 A | 3/2013 |
| WO | 2014/081389 A1 | 5/2014 |
| WO | 2014/188059 A1 | 11/2014 |
| WO | 2015/086888 A1 | 6/2015 |

OTHER PUBLICATIONS

Radich et al., "Graphene-based Composites for Electrochemical Energy Storage", The Electrochemical Society Interface, 2011, pp. 63-66.

Zhu et al., "The Application of Graphene in Lithium Ion Battery Electrode Materials", SpringerPlus, Oct. 8, 2014, pp. 1-8.

Cheng et al., "Carbon Nanomaterials for Flexible Energy Storage", Materials Research Letters, vol. 1, No. 4, Jun. 25, 2013, pp. 175-192.

Ren et al., "A Silicon Nanowire-reduced Graphene Oxide Composite as a High-Performance Lithium Ion Battery Anode Material", Nanoscale, No. 6, Feb. 2014, pp. 3353-3360.

Wu et al., "Two-dimensional Vanadyl Phosphate Ultrathin Nanosheets for High Energy Density and Flexible Pseudocapacitors", Nature Communications, Sep. 12, 2013, pp. 1-7.

Extended European Search Report received for corresponding European Patent Application No. 15185847.9, dated Dec. 3, 2015, 10 pages.

Kucinskis et al., "Graphene in Lithium Ion Battery Cathode Materials: A Review", Journal of Power Sources, vol. 240, Oct. 15, 2013, pp. 66-79.

Zarrin et al., "Functionalized Graphene Oxide Nanocomposite Membrane for Low Humidity and High Temperature Proton Exchange Membrane Fuel Cells", The Journal of Physical Chemistry, vol. 115, No. 42, Oct. 27, 2011, pp. 20774-20781.

International Search Report and Written Opinion received for corresponding Patent Cooperation Treaty Application No. PCT/FI2016/050629, dated Oct. 31, 2016, 17 pages.

Office action received for corresponding European Patent Application No. 15185847.9, dated Mar. 7, 2018, 5 pages.

Office action received for corresponding European Patent Application No. 15185847.9, dated Aug. 9, 2018, 5 pages.

* cited by examiner

APPARATUS AND METHOD OF PROVIDING AN APPARATUS FOR USE AS A POWER SOURCE

RELATED APPLICATION

This application was originally filed as PCT Application No. PCT/FI2016/050629 filed Sep. 12, 2016 which claims priority benefit from EP Patent Application No. 15185847.9 filed Sep. 18, 2015.

TECHNOLOGICAL FIELD

Examples of the disclosure relate to an apparatus and method of providing an apparatus for use as a power source. In particular, they relate to an apparatus and method of providing an apparatus for use as a power source where the apparatus comprises conductive carbon based materials.

BACKGROUND

Apparatus, such as batteries, for providing a power source are known. Some batteries, such as proton batteries rely on the transport of protons between an anode and cathode to provide a power source. Such apparatus typically require the use of an electrolyte such as a room temperature ionic liquid electrolyte to facilitate the transfer of protons across the junction of the apparatus.

Such apparatus may be difficult to fabricate and store as they may require liquids to be positioned within the apparatus.

It is useful to provide improved apparatus for use as a power source and methods of providing such apparatus.

BRIEF SUMMARY

According to various, but not necessarily all, examples of the disclosure there may be provided an apparatus comprising: an electrode comprising metal; an anode comprising a composite of halide salt and conductive carbon based material wherein the anode is deposited on the electrode; a cathode comprising metal; and a solid electrolyte provided between the cathode and the anode.

In some examples the conductive carbon based material may comprise graphene.

In some examples the conductive carbon based material may comprise reduced graphene oxide.

In some examples the conductive carbon based material may be formed from an ink comprising reduced graphene oxide in solution.

In some examples the anode may be arranged to react with the metal from the electrode to form metal halide and release metal cations. Transport of the released metal cations from the electrode to the cathode provides a power source.

In some examples the metal may comprise a thin metal foil layer.

In some examples the cathode may comprise the same metal as the electrode.

In some examples the metal may comprise silver.

In some examples the solid electrolyte may be arranged to absorb ambient water to enable transport of cations across the solid electrolyte In some examples the solid electrolyte may comprise graphene oxide.

In some examples the solid electrolyte may comprise Nafion.

According to various, but not necessarily all, examples of the disclosure there may be provided a battery comprising an apparatus as described above.

According to various, but not necessarily all, examples of the disclosure there may be provided a method comprising: providing an electrode comprising metal; providing an anode comprising a composite of halide salt and conductive carbon based material wherein the anode is deposited on the electrode; providing a cathode comprising metal; and providing a solid electrolyte between the cathode and the anode.

In some examples the conductive carbon based material may comprise graphene.

In some examples the conductive carbon based material may comprise reduced graphene oxide.

In some examples the method may comprise forming the conductive carbon based material from an ink comprising reduced graphene oxide in solution.

In some examples the anode may be arranged to react with the metal from the electrode to form metal halide and release metal cations. Transport of the released metal cations from the electrode to the cathode may provide a power source.

In some examples the metal may comprise a thin metal foil layer.

In some examples the cathode may comprise the same metal as the electrode.

In some examples the metal may comprise silver.

In some examples the solid electrolyte may be arranged to absorb ambient water to enable transport of cations across the solid electrolyte In some examples the solid electrolyte may comprise graphene oxide.

In some examples the solid electrolyte may comprise Nafion.

According to various, but not necessarily all, examples of the disclosure there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

The figures illustrate an apparatus 1 and method of providing an apparatus 1. The apparatus 1 comprises: an electrode 3 comprising metal; an anode 5 comprising a composite of halide salt and conductive carbon based material wherein the anode is deposited on the electrode 3; a cathode 9 comprising metal; and a solid electrolyte 7 provided between the cathode 9 and the anode 5.

The apparatus 1 may be for use as a power source. For instance, the power source may be used to provide power to components of an electronic device. The electronic device could be a communication device or any other suitable device. The apparatus 1 may be provided within a battery 41, 51 or any other suitable energy storage device.

Figure 1:
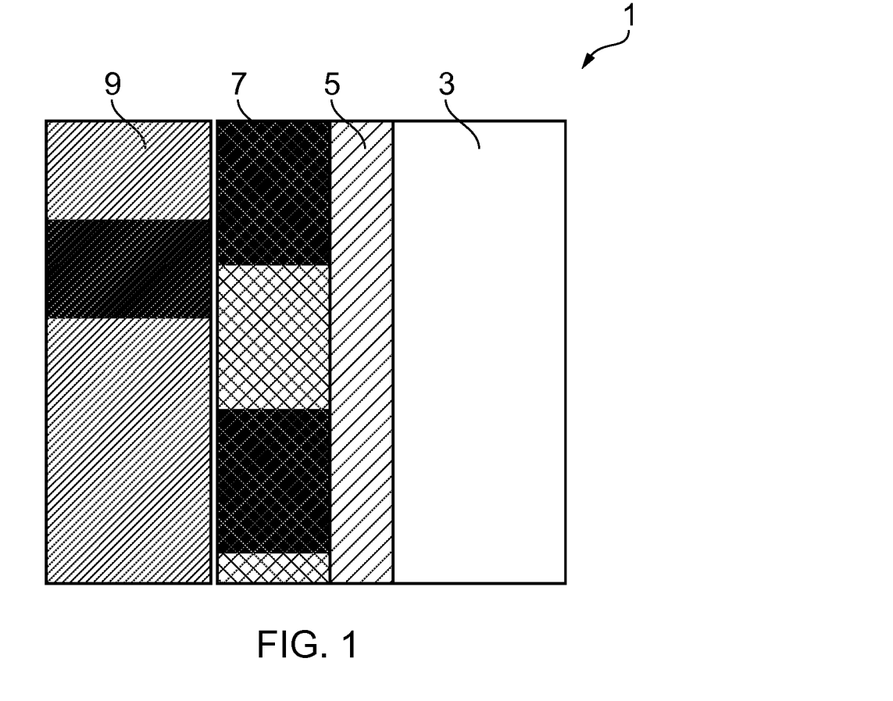
FIG. 1 illustrates an apparatus.

FIG. 1 schematically illustrates an example apparatus 1 which may be provided in examples of the disclosure. The apparatus 1 comprises an electrode 3, an anode 5 a solid electrolyte 7 and a cathode 9. The electrode 3, anode 5, solid electrolyte 7 and cathode 9 may be arranged in a planar structure. Other arrangements of respective components may be used in other examples of the disclosure.

The electrode 3 may comprise any means which provides a path for charges to the anode 5. In some examples the electrode 3 may comprise a metal. In some examples the electrode 3 may comprise a thin layer of metal. In some examples the electrode 3 may comprise a thin metal foil. The metal foil may be thin so that the apparatus 1 forms a flexible apparatus 1 which may be easily deformed and/or rolled up. The electrode 3 may combine with the anode 5 to enable chemical reactions which allow the apparatus 1 to be used as a power source.

Any suitable metal may be used for the electrode 3. The metal which is used for the electrode 3 may depend on the materials that are used within the anode 5. In some examples the electrode 3 may comprise silver, aluminium, copper, zinc or any other suitable metal.

The anode 5 may comprise any means which may be arranged as a source of positive charges for the apparatus 1. In examples of the disclosure the anode 5 comprises a composite of a halide salt and conductive carbon based material.

The conductive carbon based material may comprise any conductive material comprising carbon which enables halide salts such as alkali metal halides to be mixed within it. The conductive carbon material may provide a support structure through which the halide salt may be distributed. The use of a conductive material may facilitate the transfer of cations from the electrode 3 and through the apparatus 1.

In some examples the conductive carbon based material comprises graphene. In some examples the conductive carbon based material may comprise reduced graphene oxide. In such examples the conductive carbon based material of the anode 5 may be formed from an ink comprising reduced graphene oxide in solution.

The reduced graphene oxide may be fully reduced graphene oxide or highly reduced graphene oxide. The fully reduced graphene oxide may have all or almost all of the oxygen and/or any other functional groups removed from the graphene structure. This may ensure a high level of electrical conductivity for the reduced graphene oxide.

The halide salt may comprise any salt comprising a halogen. The halogen could comprise chlorine, bromine, iodine or any other suitable halogen. In some examples the halide salt could comprise alkali metal. In such examples the alkali metal could comprise lithium, sodium, potassium or any other suitable alkali metal.

In examples of the disclosure the anode 5 is deposited on the electrode 3. The anode 5 may be deposited on the electrode 3 so that charges from the electrode 3 may be transferred to the anode 5. In some examples the anode may be arranged so that the metal from the electrode 3 reacts with the anode 5 to form metal halide and release metal cations. In some examples of the disclosure the anode 5 may be printed on the electrode 3.

The electrolyte 7 may comprise any means which may provide for the conduction of free ions between the anode 5 and cathode 9. In some examples the electrolyte 7 may provide for the conduction of cations. The electrolyte 7 may provide for the conduction of metal cations from the electrode 3. The electrolyte 7 may enable the transfer of cations form the anode 5 to the cathode 9. In examples of the disclosure the electrolyte 7 may be a solid electrolyte 7.

In some examples the solid electrolyte 7 may comprise an insulating material. The insulating material may comprise a material which enables transfer of cations but does not conduct anions or electrons. In some examples the insulating material may comprise graphene oxide.

The graphene oxide may be provided within a composite comprising a polymeric material. In some examples the graphene oxide may be present in a higher quantity than the polymeric material. For instance in some examples the graphene oxide may comprise 25 times the weight of the polymeric material. It is to be appreciated that other proportions of graphene oxide and polymeric material may be used in other examples of the disclosure.

The polymeric material may comprise a material which enables transfer of cations but does not conduct anions or electrons. In some examples the polymeric material may comprise a tetrafluorethylene based polymer such as Nafion. Nafion may have a high conductivity for protons and cations.

The ionic conductivity of the solid electrolyte 7 may be dependent upon the relative humidity of the environment around the apparatus 1. This may require the apparatus 1 to be used in a humid environment. For example it may require humidity levels between 30% and 70%.

The solid electrolyte 7 is provided between the anode 5 and the cathode 9. The solid electrolyte 7 may be positioned so that a junction is formed between the solid electrolyte 7 and the anode 5. The junction may enable cations to be transferred from the anode 5 to the solid electrolyte 7. The solid electrolyte 7 may also be positioned to form a junction with the cathode 9. The junction with the cathode 9 may enable cations to be transferred from the solid electrolyte 7 to the cathode 9.

The cathode 9 may comprise any means which may be arranged to attract positive charges from the anode 5. In some examples the cathode 9 may comprise a metal. In some examples the metal used for the cathode 9 may be the same as the metal used for the electrode 3. In some examples the metal used for the cathode 9 may be different to the metal used for the electrode 3. In some examples the cathode 9 may comprise a thin metal foil. The metal foil may be thin so that the apparatus 1 forms a flexible apparatus 1 which may be easily deformed and/or rolled up.

Any suitable metal may be used for the cathode 9. In some examples the cathode 9 may comprise silver, aluminium, copper, zinc or any other suitable metal.

In some examples the cathode 9 may comprise a plurality of layers of different materials. For instance in some examples the cathode 9 could comprise a layer of silver coated with a layer of silver nitrate. This layer of silver nitrate may provide silver cations for the cathode reduction reaction which comprises the combination of the silver cations with free electrons to form silver.

It is to be appreciated that only features necessary for the description are illustrated in FIG. 1. It is to be appreciated that the apparatus 1 may comprise other components which are not illustrated in FIG. 1. For instance, the apparatus 1 may be provided on a flexible substrate and/or may comprises encapsulating or packaging layers.

The apparatus 1 may be provided on a substrate to form a battery 41, 51 as described below and illustrated in FIGS. 4 to 8.

Figure 2:
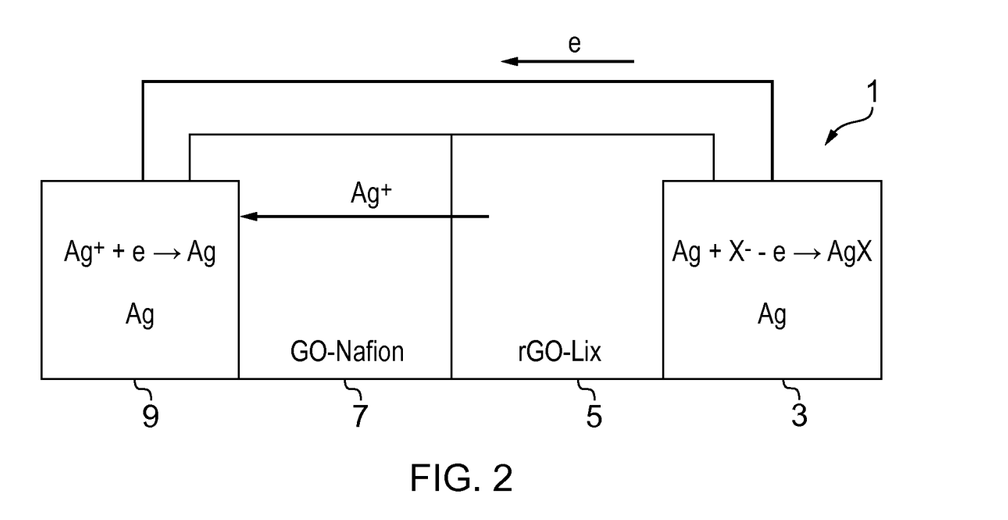
FIG. 2 illustrates a mechanism for charge transport in an example apparatus.

FIG. 2 illustrates an example mechanism for charge transport in an example apparatus 1. The example apparatus of FIG. 2 comprises an electrode 3, an anode 5 a solid electrolyte 7 and a cathode 9 which may be as described above. Corresponding reference numerals are used for corresponding features.

In the example of FIG. 2 the electrode 3 and the cathode 9 comprise silver Ag. The anode 5 comprises a composite of lithium halide LiX within a reduced graphene oxide structure. In FIG. 2 X represents any halide. It is to be appreciated that other metals could be used in place of lithium and/or silver in other examples of the disclosure. The solid electrolyte 7 comprises a mixture of graphene oxide and Nafion.

The apparatus 1 may be arranged to provide a source of power. In use the lithium halide LiX may react with the metal of the electrode 3 to form silver halide AgX and a free electron $e^-$. This reaction may also produce silver cations $Ag^+$.

The silver cations $Ag^+$ are conducted through conductive carbon material of the cathode 5 and through the electrolyte 7 to the cathode 9. At the cathode 9 the silver cations $Ag^+$ recombine with free electrons $e^-$ to form silver Ag.

Therefore the apparatus 1 provides a mechanism for charge transport between the anode 5 and cathodes 9 which may be used to provide power to devices such as electronic devices.

In the example of FIG. 2 the solid electrolyte 7 requires ambient water in order to enable the transport of the cations. This may require the apparatus 1 to be used within a humid environment. In some examples the solid electrolyte 7 may be arranged to transport cations if the relative humidity of the environment is between 30% to 70%. As normal ambient conditions are usually between 50% and 70% relative humidity this may enable the apparatus 1 to be used in normal ambient conditions. This may enable the apparatus 1 to be fabricated without packaging, such as hermetic sealing, which may be arranged to keep water out of the apparatus 1. This may make the apparatus 1 simpler to fabricate. In other examples hermetic sealing may be provided around the apparatus 1 to keep water out of the apparatus 1 until the apparatus 1 needs to be used.

Also, as the environmental humidity is needed to enable the Nafion to transport the cations the circuit path between the anode 5 and the cathode 9 can be broken by placing the apparatus 1 in an environment which does not have the required humidity levels. For instance, if the apparatus 1 is stored in a vacuum packaging there is no ambient water to enable the charge transfer through the solid electrolyte 7. This may prevent any reactions from occurring within the apparatus 1. As the lack of humidity prevents the reactions within the apparatus 1 the apparatus 1 may be stored for a long time without any degradation of the apparatus 1. This may provide a simple and effective method for storing the apparatus 1 which may increase the shelf life of the apparatus 1 and any devices which the apparatus 1 may be comprised within.

Figure 3:
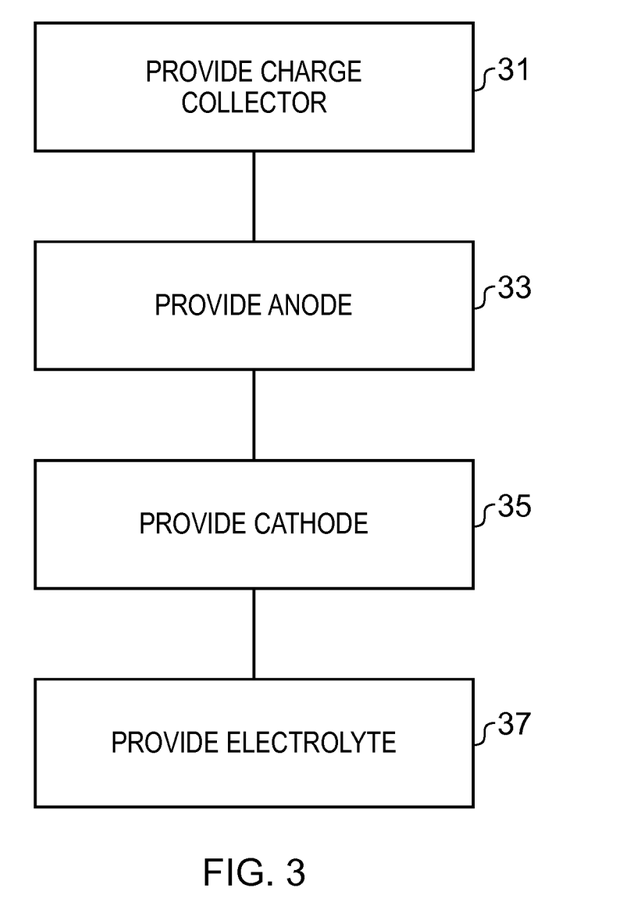
FIG. 3 illustrates a method.

FIG. 3 illustrates a method which may be used to form apparatus 1 such as the apparatus 1 of FIG. 1. The example method comprises, at block 31, providing an electrode 3 comprising metal and at block 33, providing an anode 5 comprising a composite of halide salt and conductive carbon based material. The anode 5 may be deposited on the electrode 3. The method also comprises, at block 35, providing a cathode 9 comprising metal and, at block 37 providing a solid electrolyte 7 between the cathode 9 and the anode 5.

It is to be appreciated that the blocks of the method may be carried out in any suitable order. Two or more of the blocks may be performed simultaneously. For instance, in some examples the electrode 3 and the cathode 9 may be printed simultaneously. A gap may be provided between the electrode 3 and the cathode 9. The anode 5 may then be coated on the electrode 3 and the electrolyte 7 may be coated on the cathode 9. The two parts may then be combined to form the apparatus 1.

It is to be appreciated that any suitable techniques may be used to fabricate the respective parts of the apparatus 1. The techniques which are used may depend on the materials that are used for the respective parts.

Figure 4:
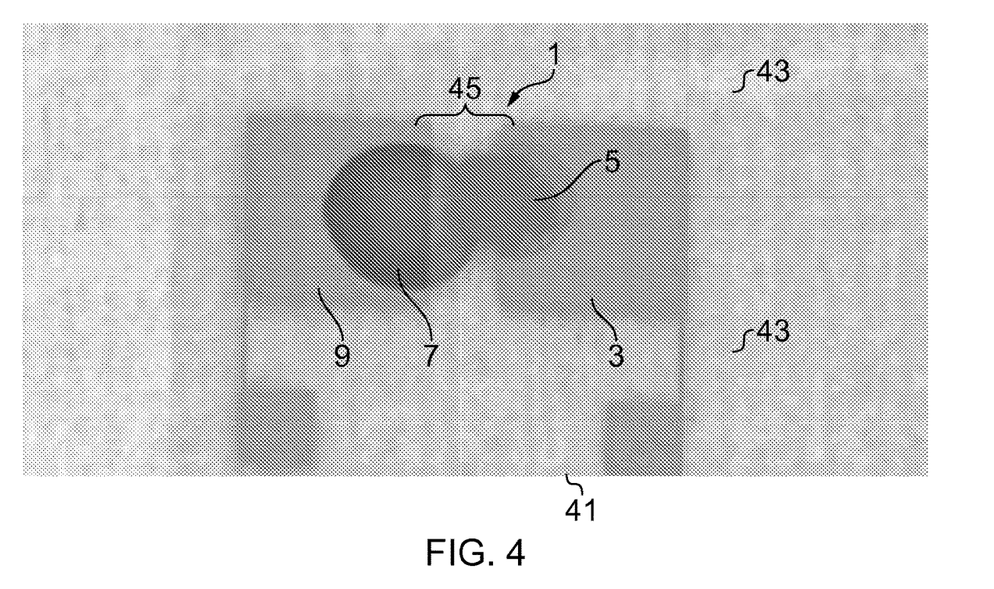
FIG. 4 illustrates a battery comprising an apparatus.

FIG. 4 illustrates a battery 41 comprising an apparatus 1 as described above.

The electrode 3 and the cathode 9 may be formed from the same material. This may enable the electrode 3 and the cathode 9 to be formed at the same time. This may reduce the number of different blocks of a method needed to fabricate the battery 41.

In the example of FIG. 4 the cathode 9 and the electrode 3 comprise silver. The cathode 9 and the electrode 3 were formed by screen printing onto a substrate 43. Other methods maybe used in other examples of the disclosure.

In the example of FIG. 4 the cathode 9 has the same size and shape as the electrode 3. It is to be appreciated that in other examples the cathode 9 could have a different size and/or shape to the electrode 3.

A gap 45 is provided between the electrode 3 and the cathode 9. In the example of FIG. 4 the gap 45 is 2 mm. Other sized gaps may be used in other examples.

In the example battery 41 of FIG. 4 the electrode 3 and a cathode 9 are printed on a substrate 43. The substrate 43 may be a flexible substrate which may enable the battery to be rolled up and/or bent. The substrate 43 may comprise any suitable material such as polyethylene naphthalate (PEN) or any other suitable material.

In the example of FIG. 4 the anode 5 comprises a composite of reduced graphene oxide and lithium chloride.

The reduced graphene oxide may be synthesised using any suitable technique. In the example of FIG. 4 the reduced graphene oxide was formed by adding 10 ml of a graphene oxide suspension to a mixture of L-ascorbic acid and hydrochloric acid. The mixture was then stirred vigorously at a temperature of 60 degrees C. for 5 hours until a black suspension is formed. The suspension mixture was vacuum filtered through a glass frit filter while the mixture was still hot. The black solid which is captured by the filter was washed with large amounts of deionised water until the pH of the filtrate was measured as 7. The black solid was then washed with isoproponal and acetone. The final reduced graphene oxide comprises a black powder and is collected by drying the solid on the filter in a vacuum.

To form the composite with lithium chloride the reduced graphene oxide is dispersed in deionised water. In the example of FIG. 4 10 mg of reduced graphene oxide was dispersed in 10 ml of deionised water. The suspension is then sonicated. In the example of FIG. 4 the suspension was sonicated for 5 minutes. Lithium chloride in aqueous solution is then added to the suspension to form a reduced graphene oxide-lithium chloride ink. The lithium chloride is added so that the final concentration of lithium chloride in the ink has a desired level. In the example of FIG. 4 the concentration of lithium chloride was 0.1M. Other concentrations may be used in other examples of the disclosure.

The anode 5 is deposited on the electrode 3. In the example of FIG. 4 the reduced graphene oxide-lithium chloride ink is drop cast on the electrode 3. Other means of depositing the anode 5 on the electrode 3 may be used in other examples of the disclosure.

In the battery 41 of FIG. 4 5 μl of reduced graphene oxide-lithium chloride ink were deposited. The reduced graphene oxide-lithium chloride ink had concentrations of 1 mg/ml for reduced graphene oxide and 0.1M for lithium chloride.

The solid electrolyte 7 comprises a composite of Nafion and graphene oxide and is deposited on the cathode 9. In the example of FIG. 4 the Nafion-graphene oxide mixture is drop cast on the cathode 9. Other means of depositing the electrolyte 7 on the cathode 9 may be used in other examples of the disclosure.

In the battery 41 of FIG. 4 10 μl of Nafion-graphene oxide mixture was deposited. The Nafion-graphene oxide mixture had concentrations of 0.5 mg/ml graphene oxide and ca 2.5% wt Nafion. Other concentrations may be used in other examples of the disclosure.

The solid electrolyte 7 is deposited so that it overlaps a portion of the anode 5 so that a junction is formed between the anode 5 and the electrolyte 7.

The example battery 41 of FIG. 4 provides a high specific capacity. A discharge test was carried out at 30° C. and 70% relative humidity and the battery 41 provided a capacity by area of 50 μAh/cm$^2$ and a specific capacity of 4.75 Ah/g. Only active material was considered in the calculation of the specific capacity of the battery 41.

Figure 5:
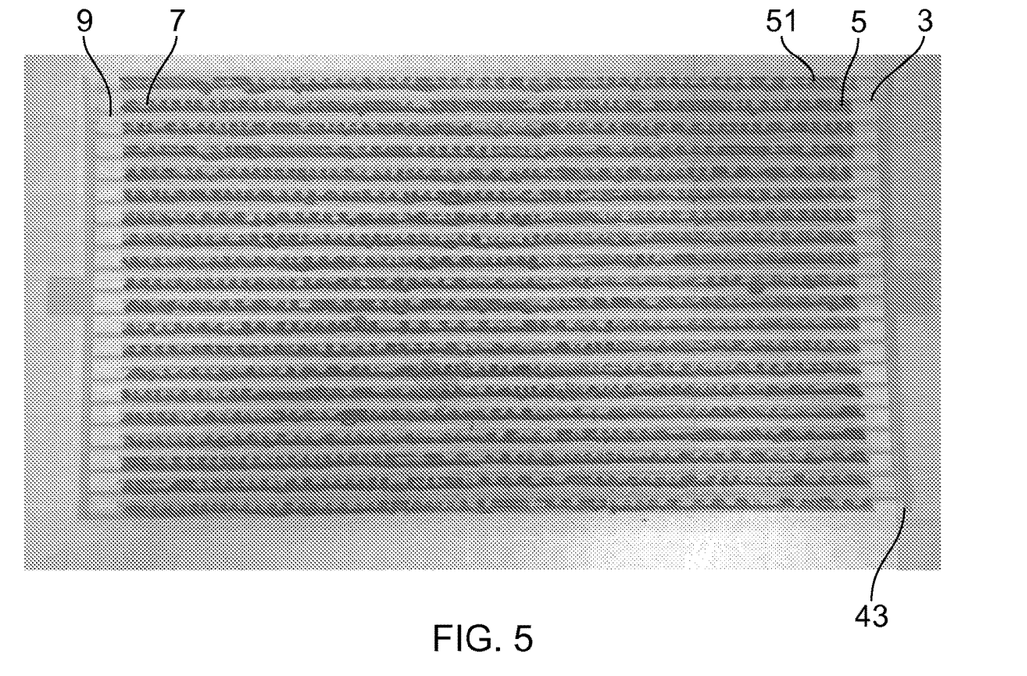
FIG. 5 illustrates a battery comprising a plurality of apparatus.

FIG. 5 illustrates another battery 51 which may comprise a plurality of apparatus 1. The battery 51 is printed over a large surface area and may be used when flexed and/or bent. Each of the apparatus 1 within the battery 51 comprises an electrode 3, an anode 5, a solid electrolyte 7 and a cathode 9. The battery 51 may also be provided on a substrate 43 which may be as described above.

In the example battery 51 of FIG. 5 a plurality of cathodes 9 and electrodes 3 are printed onto the substrate 43. The plurality of cathodes 9 and electrodes 3 may be printed in an interdigitated structure. The interdigitated structure may provide for a large active area for the battery 51.

The anodes 5 may comprise any suitable composite of conductive carbon material and alkali metal salt. The anodes 5 could comprise a composite of reduced graphene oxide and lithium chloride as used in the example battery 41 of FIG. 4. The anodes 5 are deposited on the electrodes 3.

The solid electrolyte 7 comprises any suitable material such as a composite of Nafion and graphene oxide. The solid electrolyte 7 is deposited on the cathode 9. The solid electrolyte 7 overlaps portions of the anodes 5 so that junctions are formed between the anodes 5 and the solid electrolyte 7 which may be as described above.

FIGS. 6A to 6D illustrate an example battery 51 in use. The battery 51 could be a battery 51 as illustrated in FIG. 5 and described above.

Figures 6A, 6B:
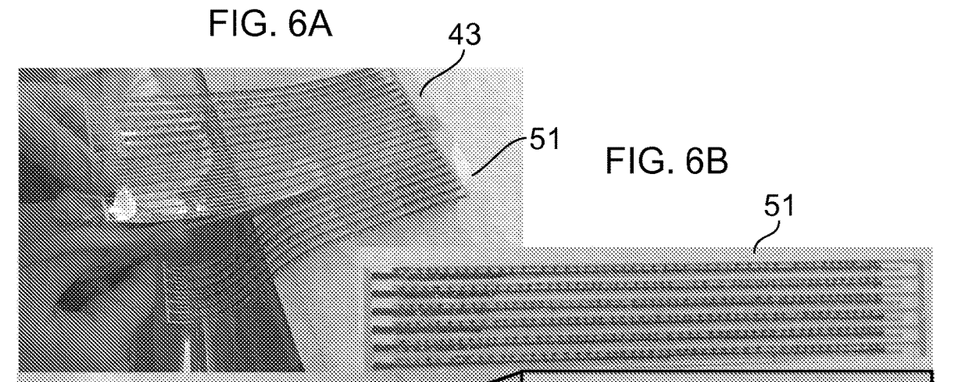
FIGS. 6A to 6D illustrate an example battery in use.

In FIG. 6A a battery 51 of the required size is obtained. In FIG. 6A a large battery 51 is provided on a substrate 43. A battery 51 of a desired size is obtained by cutting the substrate 43 between adjacent cathodes 9 and electrodes 3.

The battery 51 may be cut using any suitable technique. As the battery 51 is provided on a flexible substrate 43 formed from a material such as PEN the substrate 43 may be cut using scissors or any other readily available cutting implement. This may enable mass production of batteries 51 as a large number of batteries 51 can be printed on the same substrate 43 and then separated after fabrication.

FIG. 6B illustrates the battery 51 which has been cut down to the required size.

Figure 6C:
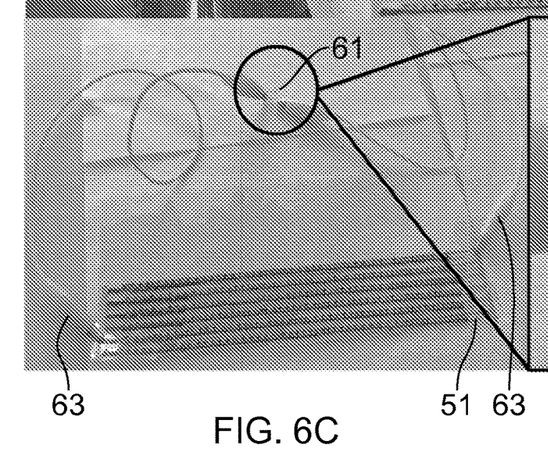

In FIG. 6C contacts 63 are connected to the cathode 9 and the electrode 3. The contacts 63 connect the battery to an LED (light emitting diode) 61.

Figure 6D:
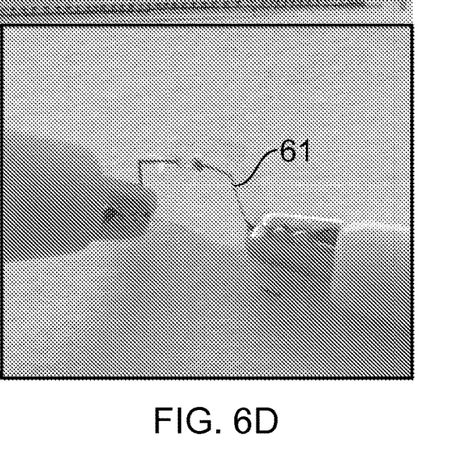

FIG. 6D shows a close up of the LED 61 of FIG. 6C. FIG. 6D shows that the LED 61 is illuminated by the power provided from the battery 51.

Figure 7A:
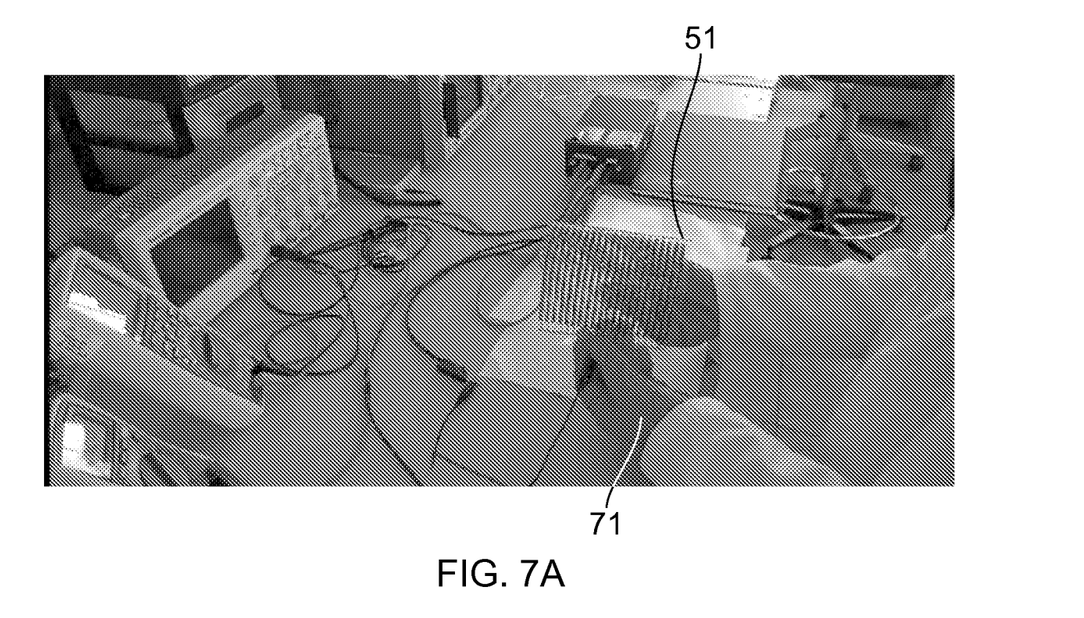
FIGS. 7A to 7C illustrate another example battery in use.
Figure 7B:
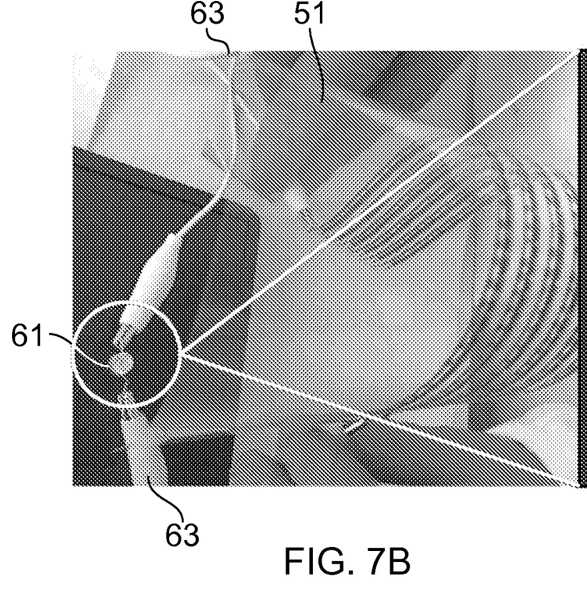
Figure 7C:
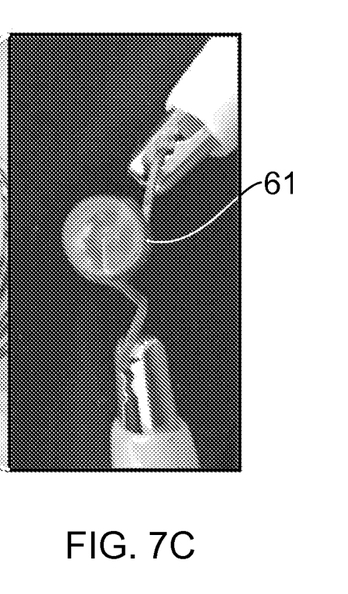

FIGS. 7A to 7C illustrate another example battery 51 in use. The battery 51 could be a battery 51 as illustrated in FIGS. 5 and 6A to 6B and described above.

In FIG. 7A the battery 51 is bent into a curved shape. In the example of FIG. 7A the battery 51 is provided on a flexible substrate 43 so that a user may bend the battery 5 using their hands 71 and without and specialist tools.

In the example of FIG. 7A the battery 51 is bent into a curved shape. In other examples the battery 51 may be bent into other different shapes or configurations.

In FIG. 7B contacts 63 are connected to the cathode 9 and the electrode 3 of the curved battery 51. The contacts 63 connected the battery to an LED 61.

FIG. 7C shows a close up of the LED 65 from FIG. 7B. FIG. 7B shows that the LED 61 is illuminated by the power provided from the battery 51 even when the battery 51 is bent.

Figure 8:
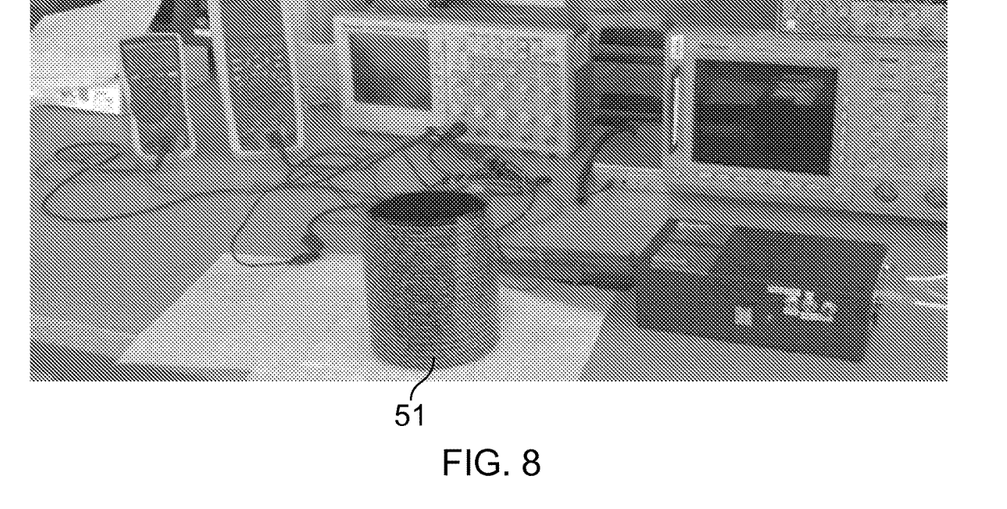
FIG. 8 illustrates an example battery.

FIG. 8 illustrates another example battery 51. The battery 51 could be a battery 51 as illustrated in FIGS. 5 and 6A to 7C and described above.

In FIG. 8 the battery 51 is rolled into a cylindrical shape. The cylindrical battery 51 may still be used to power electronic devices. It is to be appreciated that in other examples the battery 51 may be bent into other different shapes or configurations.

Figure 9A:
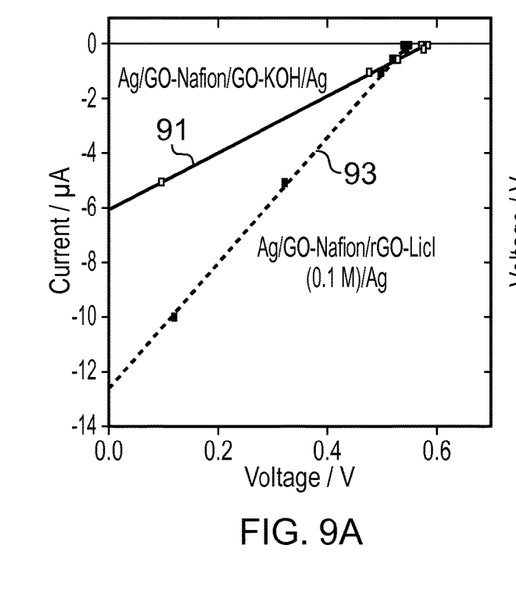
FIGS. 9A and 9B illustrate plots of data obtained using example apparatus.
Figure 9B:
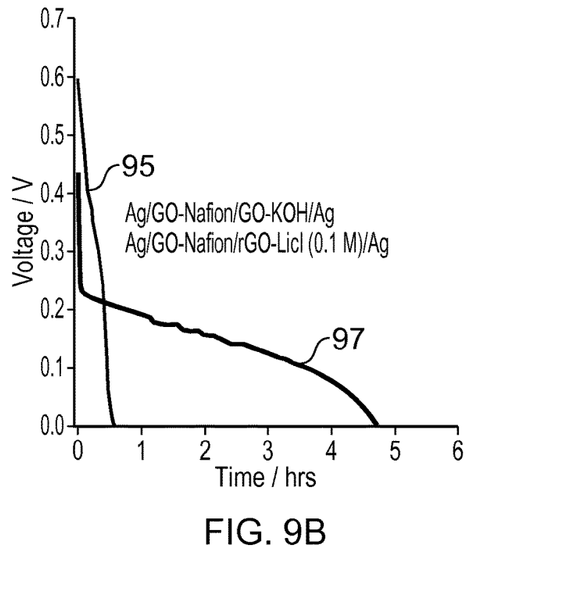

FIGS. 9A and 9B illustrated plots of data obtained using example apparatus 1. The data of FIGS. 9A and 9B was obtained using a battery 41 such as the battery of FIG. 4. In both FIGS. 9A and 9B the data was obtained from tests carried out in an environmental chamber and 30° C. and at 70% humidity.

FIG. 9A is a plot of open circuit voltage and current. The upper plot 91 shows data obtained with a proton battery comprising potassium hydroxide. The proton battery used a room temperature ionic liquid electrolyte to boost the current within the battery. To obtain the data in FIG. 9A triethylsulfonium bis(trifluoromethane)sulfonimide was used as the room temperature ionic liquid electrolyte.

The lower plot 93 shows data obtained with the battery 41 of FIG. 4. The concentration of the lithium chloride within the composite of the anode 5 was 0.1M.

FIG. 9B is a plot of voltage and time which shows the time taken for the respective batteries to discharge. The plot 95 shows data obtained with a proton battery and shows that the proton battery discharges very quickly.

The plot 97 shows data obtained with the battery 41 of FIG. 4 and shows that the batteries made according to examples of the disclosure discharge much more slowly than the proton batteries.

Figure 10:
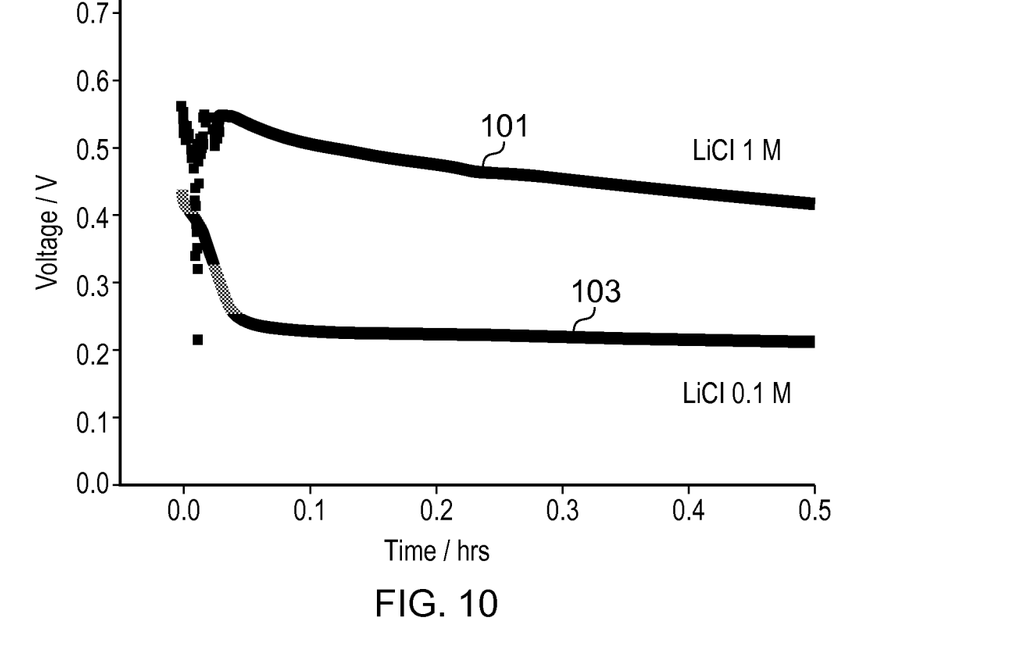
FIG. 10 illustrates a plot of data obtained using example apparatus.

FIG. 10 shows plots of data obtained from batteries 41 having different concentrations of lithium chloride. FIG. 10 is a plot of voltage and time which shows the time taken for the respective batteries 41 to discharge.

The data was obtained using batteries 41 formed as described in relation to FIG. 4. The first plot 101 was obtained with a concentration of 1M lithium chloride and the second plot 103 was obtained with a concentration of 0.1M lithium chloride. The data was obtained from tests carried out in an environmental chamber and 30° C. and at 70% relative humidity.

The plots of FIG. 10 show that the increase in concentration of the lithium chloride increases the initial open circuit voltage from 0.45V to 0.55V and increases the discharge plateau voltage from 0.2V to 0.4V. This indicates that the difference in work function between the anode 5 and the cathode 9 is not the main factor in determining the voltage of the battery 41. The plots show that improved performance is achieved by increasing the concentration of lithium chloride which indicates that a concentration cell effect exists. This may enable the voltage of the batteries 41, 51 to be tuned by controlling the concentration of the halide salts within the anode 5.

Figure 11:
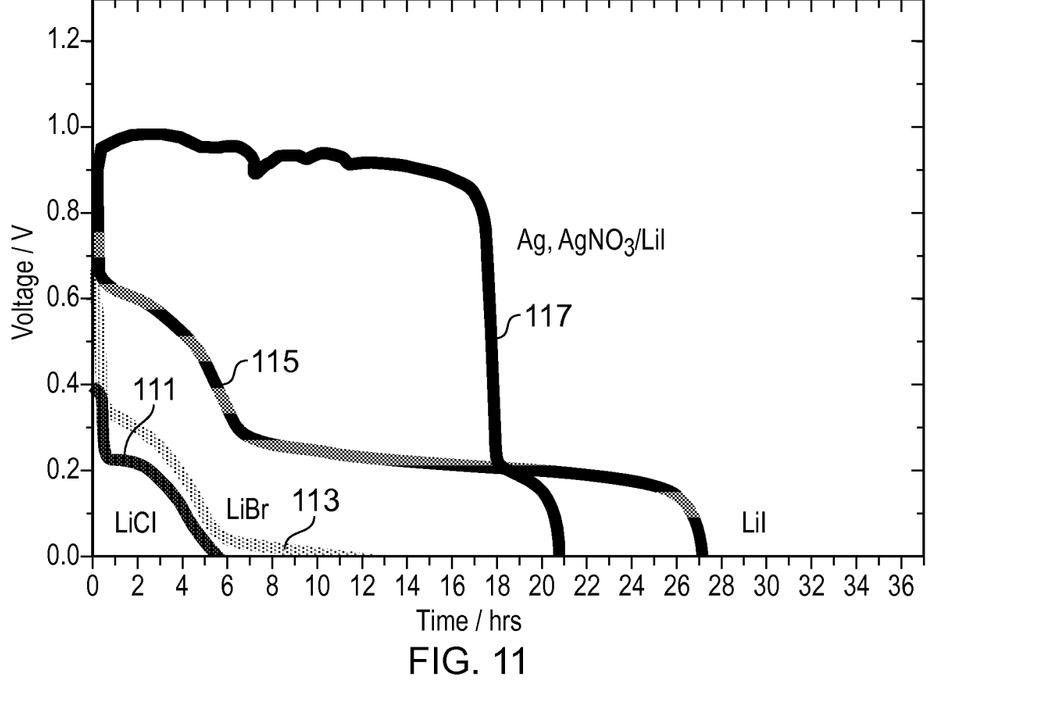
FIG. 11 illustrates a plot of data obtained using example apparatus.

FIG. 11 shows plots of data obtained from batteries 41 having different lithium halides within the anodes 5. FIG. 11 is a plot of voltage and time which shows the time taken for the respective batteries 41 to discharge. The data was obtained from tests carried out in an environmental chamber and 30° C. and at 70% relative humidity.

The data was obtained using batteries 41 formed as described in relation to FIG. 4. The first plot 111 was obtained using lithium chloride, the second plot 113 was obtained using lithium bromide and the third plot 115 was obtained using lithium iodide. The fourth plot 117 was also obtained using lithium iodide however to obtain the data for the fourth plot 117 the cathode 9 used comprised silver with a layer of silver nitrate.

The difference in performance which is achieved with the different halides indicates that the lithium ion plays a limited role in the mechanisms for providing power in apparatus 1 according to examples of the disclosure. This is different to lithium ion based batteries in which the lithium ion is key to charge transfer.

Figure 12A:
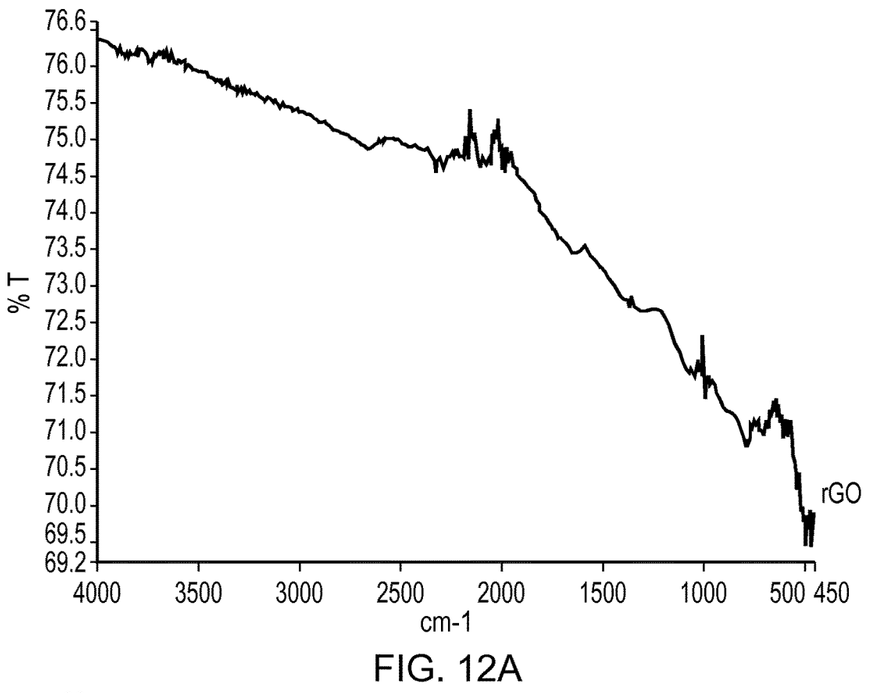
FIGS. 12A and 12B illustrate spectra of reduced graphene oxide and graphene oxide-potassium hydroxide.
Figure 12B:
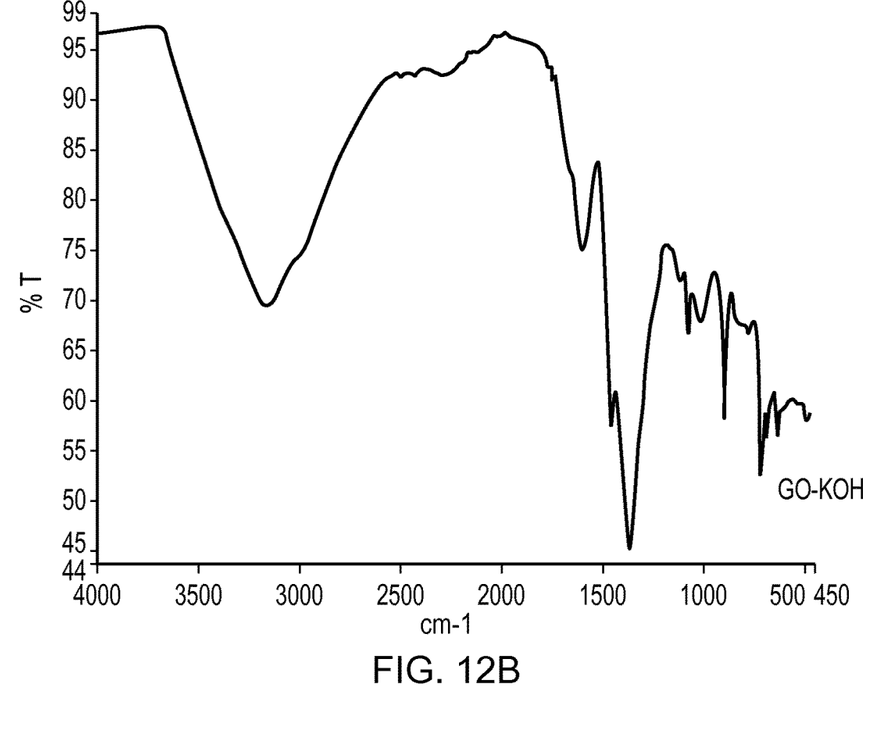

FIG. 12A illustrates a Fourier transform infrared (FTIR) spectrum of fully reduced graphene oxide which may be used in example apparatus 1. FIG. 12B illustrates a Fourier transform infrared (FTIR) spectrum of graphene oxide-potassium hydroxide.

The reduced graphene oxide may be prepared by reducing graphene oxide with any suitable reducing agent such as ascorbic acid. This may enable fully and/or highly reduced graphene oxide to be obtained. The spectrum for the fully reduced graphene oxide shows that there are no band gaps within the structure. This indicates that the oxygen and/or other functional groups have been removed from the graphene structure. Any remaining oxygen and/or functional groups are minimal and do not affect the overall structure and electrical conductivity of the reduced graphene oxide. The fully reduced graphene oxide may have a high conductivity.

The spectrum for the graphene oxide-potassium hydroxide shows that the band features typical of graphene oxide are still present. This indicates that the graphene oxide has only been partially reduced. The graphene oxide-potassium hydroxide has a much lower electrical conductivity than the fully reduced graphene oxide.

Reduced graphene oxide which was used in some of the above described examples was characterised by X-ray photoelectron spectroscopy and found to have a composition of 84% carbon, 15% oxygen and 1% other elements. After the lithium chloride was added to form a composite the composition was found to be 39% carbon, 6% oxygen, 26% lithium, 26% chlorine and 3% other elements.

Examples of the disclosure provide apparatus 1 which may be used to provide power sources.

The apparatus 1 comprises a plurality of solid layers and does not require any liquid or gels. In particular there are no liquid or gel electrolytes needed to facilitate the charge transfer. This may provide a simpler apparatus 1 which may be simpler to fabricate.

The methods which are use to fabricate the apparatus 1 may be easily scaled up as only a small number of blocks of the process are needed. Furthermore, as water based processing is required there is no need for the apparatus 1 to be fabricated in an inert or water-free environment.

In examples of the disclosure which use polymer such as Nafion for the solid electrolyte a required level of humidity may be required to use the apparatus 1. This may enable the apparatus 1 to be used in environmental conditions without additional packaging.

In examples of the disclosure fully reduced graphene oxide is used as the conductive carbon material within the anode 5. Although the reduce graphene oxide has more defects than graphene and may have a lower conductivity it may be cheaper to fabricate and may enable simpler fabrication techniques to be used. As reduced graphene oxide is dispersible in water it may be used to form an ink and printed on to the electrode 3 or other components of the apparatus 1. This may facilitate mass production of the apparatus 1.

In the above description the term "coupled" means operationally coupled. Any number of intervening components may be provided including no intervening components.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
an electrode comprising a first metal;
an anode comprising a composite of halide salt and conductive carbon based material wherein the anode is deposited on the electrode;
a cathode comprising a second metal; and
a solid electrolyte provided between the cathode and the anode, the solid electrolyte comprising a composite of an insulating material and a polymeric material.

2. An apparatus as claimed in claim 1 wherein the conductive carbon based material comprises graphene.

3. An apparatus as claimed in claim 1 wherein the conductive carbon based material comprises reduced graphene oxide.

4. An apparatus as claimed in claim 1 wherein the conductive carbon based material is formed from an ink comprising reduced graphene oxide in solution.

5. An apparatus as claimed in claim 1 wherein the anode is arranged to react with the first metal from the electrode to form metal halide and release metal cations.

6. An apparatus as claimed in claim 5 wherein transport of the released metal cations from the electrode to the cathode provides a power source.

7. An apparatus as claimed in claim 1 wherein one or both of the first metal and the second metal comprises a thin metal foil layer.

8. An apparatus as claimed in claim 1 wherein the second metal of the cathode is the same as the first metal of the electrode.

9. An apparatus as claimed in claim 1 wherein one or both of the first metal and the second metal comprises silver.

10. An apparatus as claimed in claim 1 wherein the solid electrolyte is arranged to absorb ambient water to enable transport of cations across the solid electrolyte.

11. An apparatus as claimed in claim 1 wherein the insulating material of the solid electrolyte comprises graphene oxide.

12. An apparatus as claimed in claim 1 wherein the polymeric material of the solid electrolyte comprises a tetrafluorethylene polymer.

13. An apparatus as claimed in claim 1 wherein the composite comprises 35-45% carbon, 2-10% oxygen, and 20-30% lithium.

14. A method comprising:
providing an electrode comprising a first metal;
providing an anode comprising a composite of halide salt and conductive carbon based material wherein the anode is deposited on the electrode;
providing a cathode comprising a second metal; and
providing a solid electrolyte between the cathode and the anode, the solid electrolyte comprising a composite of an insulating material and a polymeric material.

15. A method as claimed in claim 14 wherein the conductive carbon based material comprises reduced graphene oxide.

16. A method as claimed in claim 14 wherein one or both of the first metal and the second metal comprises silver.

17. A method as claimed in claim 14 wherein the solid electrolyte is arranged to absorb ambient water to enable transport of cations across the solid electrolyte.

18. A method as claimed in claim 14 wherein the insulating material of the solid electrolyte comprises graphene oxide.

19. A method as claimed in claim 14 wherein the polymeric material of the solid electrolyte comprises a tetrafluorethylene polymer.

20. A method as claimed in claim 14 wherein the composite comprises 35-45% carbon, 2-10% oxygen, and 20-30% lithium.

* * * * *